US011509481B2

(12) United States Patent
Patterson

(10) Patent No.: US 11,509,481 B2
(45) Date of Patent: Nov. 22, 2022

(54) TOKEN PROCESSING WITH SELECTIVE DE-TOKENIZATION FOR PROXIMITY BASED ACCESS DEVICE INTERACTIONS

(71) Applicant: Visa International Service Association, San Francisco, CA (US)

(72) Inventor: Barbara Patterson, South San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 205 days.

(21) Appl. No.: 16/918,739

(22) Filed: Jul. 1, 2020

(65) Prior Publication Data

US 2022/0006636 A1    Jan. 6, 2022

(51) Int. Cl.
| | | |
|---|---|---|
| *H04L 29/06* | (2006.01) | |
| *H04L 9/32* | (2006.01) | |
| *H04L 9/40* | (2022.01) | |
| *G06Q 30/00* | (2012.01) | |
| *G06Q 20/10* | (2012.01) | |

(Continued)

(52) U.S. Cl.
CPC ....... *H04L 9/3234* (2013.01); *G06Q 20/1085* (2013.01); *G06Q 20/401* (2013.01); *G06Q 20/4012* (2013.01); *G06Q 20/4014* (2013.01); *G06Q 30/0185* (2013.01); *H04L 9/3226* (2013.01); *H04L 63/083* (2013.01);
(Continued)

(58) Field of Classification Search
CPC ............. G06Q 20/1085; G06Q 20/401; G06Q 20/4012; G06Q 20/4014; G06Q 20/4018; G06Q 30/0185; G06Q 40/02; H04L 9/3226; H04L 9/3234; H04L 63/083; H04W 4/80; H04W 8/18
See application file for complete search history.

(56) References Cited

U.S. PATENT DOCUMENTS 8,590,779 B2    11/2013  Tullis et al.
9,165,294 B2    10/2015  Sharma et al.
(Continued)

FOREIGN PATENT DOCUMENTS

KR    20160005111    1/2016

OTHER PUBLICATIONS

Application No. PCT/US2021/039626, International Search Report and Written Opinion, dated Oct. 15, 2021, 10 pages.

*Primary Examiner* — Chau Le
(74) *Attorney, Agent, or Firm* — Kilpatrick Townsend & Stockton LLP

(57) ABSTRACT

A method includes providing an initial communication, by an access device to a user device. The access device can receive the user identifier and the access token and receive a secret associated with the user. The access device can determine, using the user identifier and/or the access token, if the transaction is authorized by an authorizing entity computer associated with the access device or by an authorizing entity not associated with the access device. If the transaction is authorized by the authorizing entity computer associated with the access device, the access device can transmit an authorization request message comprising the user identifier, the secret, and the access token to the authorizing entity computer. The authorizing entity computer validates the secret, retrieves a real credential of the user using the user identifier, and authorizes the transaction.

18 Claims, 5 Drawing Sheets

(51) Int. Cl.
  *G06Q 20/40*   (2012.01)
  *H04W 4/80*   (2018.01)
  *H04W 8/18*   (2009.01)
  *G06Q 40/02*   (2012.01)

(52) U.S. Cl.
  CPC ............... *H04W 4/80* (2018.02); *H04W 8/18* (2013.01); *G06Q 20/4018* (2013.01); *G06Q 40/02* (2013.01)

(56) References Cited

U.S. PATENT DOCUMENTS

| | | |
|---|---|---|
| 9,412,106 B2 | 8/2016 | Laracey |
| 9,552,573 B2 | 1/2017 | Kulpati et al. |
| 9,639,837 B2 | 5/2017 | Laracey |
| 9,972,005 B2 | 5/2018 | Wong et al. |
| 10,313,321 B2 | 6/2019 | Wong |
| 10,667,310 B2 | 5/2020 | Raj et al. |
| 2014/0164254 A1* | 6/2014 | Dimmick ............... G06Q 20/36 705/44 |
| 2014/0331060 A1* | 11/2014 | Hayton ............... H04L 63/0428 713/185 |
| 2015/0350168 A1* | 12/2015 | Hayton ................... G06F 21/41 713/168 |
| 2016/0104155 A1* | 4/2016 | Mcgaugh ............. G06Q 20/405 705/65 |
| 2017/0243184 A1 | 8/2017 | Bondesen et al. |
| 2018/0150833 A1 | 5/2018 | Carlson |
| 2018/0285875 A1 | 10/2018 | Law et al. |
| 2019/0349360 A1* | 11/2019 | Yeddula .................. H04L 63/10 |
| 2019/0356489 A1* | 11/2019 | Palanisamy ......... H04L 63/0876 |
| 2020/0195644 A1 | 6/2020 | Mori et al. |

* cited by examiner

TOKEN PROCESSING WITH SELECTIVE DE-TOKENIZATION FOR PROXIMITY BASED ACCESS DEVICE INTERACTIONS

BACKGROUND

Users can initiate interactions with access devices (e.g., ATMs) with a payment card. The user can initiate an interaction with an access device using a payment card that is associated with a particular authorizing entity computer. Upon reading the payment card, the access device can prompt the user to input a PIN. The access device can send a message with the user's account number and the PIN (e.g., in a PIN block) to an ATM controller (ATMC).

An ATM controller (ATMC) is a system used to route transactions between ATMs, core banking systems and other banks. An ATMC can be referred to as an switch. A message may enter an ATMC from an ATM, another ATMC, or a third party. When receiving a message, the ATMC will examine the message, validate a PIN block if present, and then route the message according to the leading digits of the account number referenced.

The routed message can be sent to a core banking system to check the available balances and to authorize the transaction, or sent to another bank's ATMC. For example, if a customer of Bank A used their card at an ATM belonging to Bank B, the message would be forwarded to Bank B's ATMC. The ATMC would examine the message, and based upon the account number determine that the appropriate ATMC to contact would be Bank A. It would then forward the message to Bank A's ATMC for authorization.

Embodiments of the disclosure address this problem and other problems individually and collectively.

SUMMARY

Embodiments are related to methods and systems for selective token processing based access device interactions.

One embodiment is related to a method comprising: providing, by an access device to a user device associated with a user in a transaction, an initial communication; receiving, by the access device from the user device, a user identifier and an access token; receiving, by the access device, a secret associated with the user; determining, by the access device, using the user identifier and/or the access token, if the transaction is authorized by an authorizing entity computer associated with the access device or by an authorizing entity not associated with the access device; if the transaction is authorized by the authorizing entity computer associated with the access device, then transmitting an authorization request message comprising the user identifier, the secret, and the access token to the authorizing entity computer, wherein the authorizing entity computer validates the secret, retrieves a real credential of the user using the user identifier, and authorizes the transaction; and if the transaction is not associated with the authorizing entity computer, then transmitting the authorization request message comprising the user identifier, the secret, and the access token to a token service computer, wherein the token service computer detokenizes the access token to obtain the real credential replaces the access token with the real credential in the authorization request message to form a modified authorization request message, and forwards the modified authorization request message to another authorizing entity computer for authorization.

Another embodiment is related to an access device comprising: a processor; and a computer-readable medium coupled to the processor, the computer-readable medium comprising code executable by the processor for implementing a method comprising: providing, to a user device associated with a user in a transaction, an initial communication; receiving, by the access device from the user device, a user identifier and an access token; receiving a secret associated with the user; determining using the user identifier and/or the access token, if the transaction is authorized by an authorizing entity computer associated with the access device or by an authorizing entity not associated with the access device; if the transaction is authorized by the authorizing entity computer associated with the access device, then transmitting an authorization request message comprising the user identifier, the secret, and the access token to the authorizing entity computer, wherein the authorizing entity computer validates the secret, retrieves a real credential of the user using the user identifier, and authorizes the transaction; and if the transaction is not associated with the authorizing entity computer, then transmitting the authorization request message comprising the user identifier, the secret, and the access token to a token service computer, wherein the token service computer detokenizes the access token to obtain the real credential, replaces the access token with the real credential in the authorization request message to form a modified authorization request message, and forwards the modified authorization request message to another authorizing entity computer for authorization.

Another embodiment is related to a method comprising: receiving, by an authorizing entity computer, an authorization request message comprising a user identifier, a secret, and an access token from an access device in communication with a user device associated with a user during a transaction, wherein the transaction was determined by the access device to be authorized by the authorizing entity computer associated with the access device, wherein the authorizing entity computer is associated with the access device; validating, by the authorizing entity computer, the secret, retrieving, by the authorizing entity computer, a real credential of the user using the user identifier; authorizing, by the authorizing entity computer, the transaction based on whether or not the secret is validated and/or whether or not the real credential is retrieved; generating, by the authorizing entity computer, an authorization response message including an indication of whether or not the transaction is authorized and the access token; and providing, by the authorizing entity computer, the authorization response message to the access device.

Further details regarding embodiments of the disclosure can be found in the Detailed Description and the Figures.

DETAILED DESCRIPTION

Figure 1:
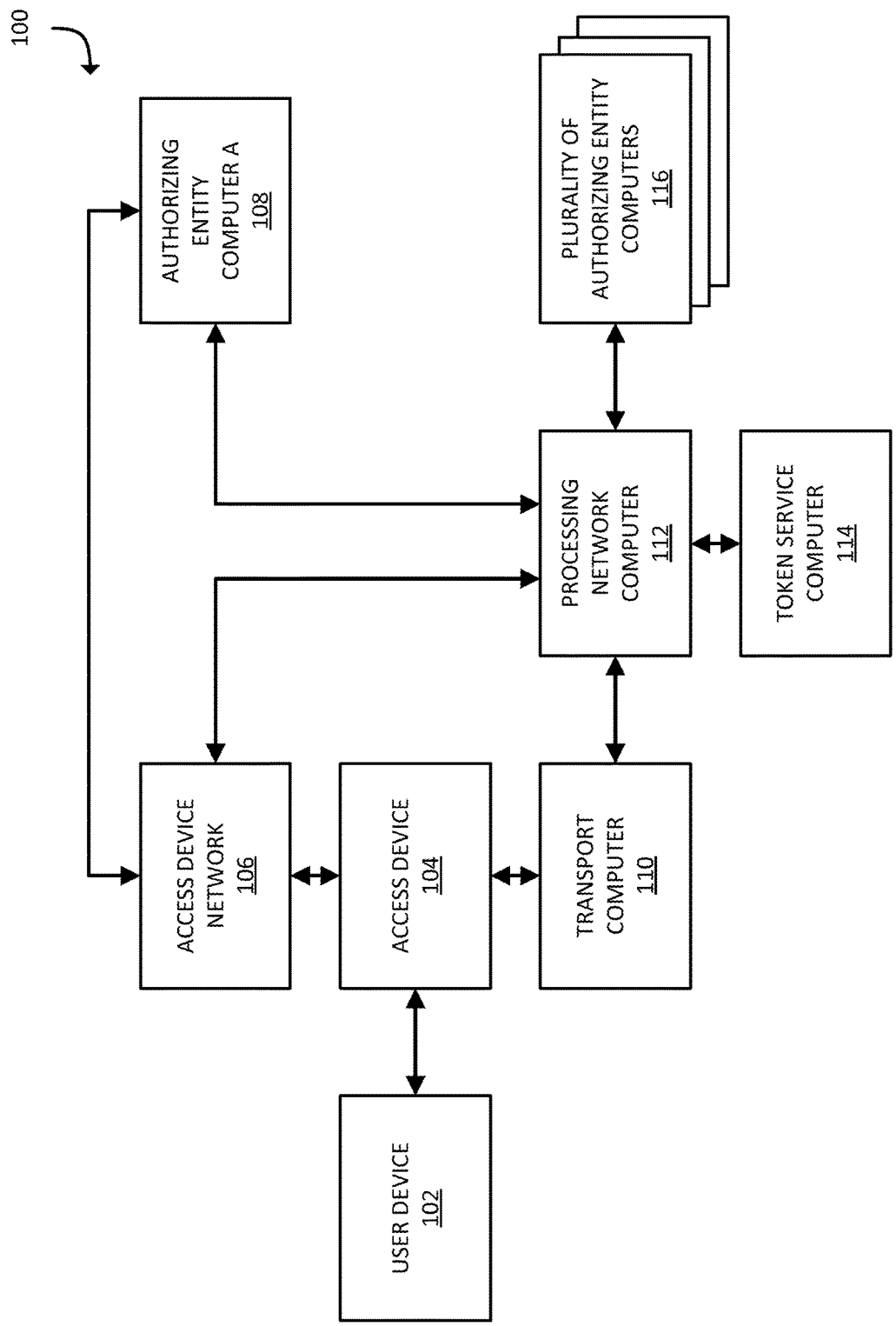
FIG. 1 shows a block diagram of an interaction processing system according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user identifier" can include any piece of data that can identify a user. A user identifier can comprise any suitable alphanumeric string of characters. In some embodiments, the user identifier may be derived from user identifying information. A user identifier can be a user information file identifier, also referred to as a customer information file identifier (CIF ID). In some embodiments, a user identifier can be a payment account reference (PAR) value when the value is associated with the user rather than a single account.

A "user information file" can be an electronic file that can stores pertinent information about a user. A user information file can be associated with a user information file identifier (e.g., a user identifier). In some embodiments, a user information file can include a user's personal information and/or a user's account information. For example, a user information file at a bank might include a user's credit relationships, accounts owned, and ownership information.

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), vending machines, automated teller machines (ATMs), virtual cash registers (VCRs), kiosks, security systems, access systems, and the like.

An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "token" may include a substitute value for a credential. A token may be a string of numbers, letters, or any other suitable characters. Examples of tokens include payment tokens, access tokens, personal identification tokens, etc.

An "payment token" may include an identifier for a payment account that is a substitute for an account identifier, such as a PAN or IBAN. For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be format preserving and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" can include a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

In embodiments of the invention, a cryptogram can be generated in any suitable manner. In some embodiments, the input to the cryptogram can include data elements including an account identifier such as primary account number, and a variable data element such as a counter, a time of day, or interaction value. Such data may be included using an encryption process such as DES, triple DES, or AES using any suitable encryption keys. The encryption keys may also be UDKs or unique derived keys, and may be generated based upon device specific information such as an account number, which may be encrypted using a master derivation key (MDK). The cryptogram can be verified by another computer such a remote computer by either decrypting the cryptogram to and verifying the decrypted contents with other data (e.g., an account number stored on file), or by encrypting other inputs and then comparing the encrypted result to the cryptogram.

A "secret" can include something that is kept or meant to be kept unknown or unseen by others. A secret can be known by a user of a user device as well as by a authorizing entity of an authorizing entity computer. For example, a secret can be a personal identification number (PIN). In some embodiments, a secret can be created by a user and provided to an authorizing entity computer during provisioning and/or enrollment by the user to obtain a real credential. In other embodiments, a secret can be created by an authorizing entity computer and then assigned and provided to the user. In some embodiments, a secret can include a one-time password (OTP).

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), an access token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "resource provider" may be an entity that can provide a resource such as goods, services, information, and/or access. Examples of resource providers includes merchants, data providers, transit agencies, governmental entities, venue and dwelling operators, etc.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Introduction

Current, network based tokenization was designed for access device (e.g., point-of-sale (POS) device) environments and does currently enable closed loop or "on-us" access device services nor access device access to secondary accounts. A closed loop or "on-us" service is a service that can be provided in the network of the access device, while an open loop or "off-us" service is a service that is provided by an authorizing entity computer in a different network than the network used by the access device. Closed loop or on-us transactions cannot use tokens in conventional systems, because the de-tokenization process that is performed on tokens is performed by a computer that is outside of the network containing the access device. These current limitations can require that authorizing entities do not enable access devices to perform proximity based on-us interactions with user devices (e.g., mobile devices) that contain tokens. Or, authorizing entities may enable access devices to communicate with user devices with tokens, but may require extensive message routing outside of the access device's network and back, thereby significantly increasing transaction times.

Embodiments of the disclosure allow for an access device that can efficiently perform an interaction with a user device containing an access token and associated with a user. For example, an access device can provide an initial communication to the user device, in response to which the user device can retrieve a user identifier and an access token from a memory. The user device can provide the user identifier and the access token to the access device. The access device can then, in some embodiments, prompt the user to input a secret associated with the user.

In various embodiments, an access token can be associated with the user identifier established by an authorizing entity computer. In some embodiments, the user identifier can be, for example, a consumer information file identifier (CIF ID). The user identifier can be stored in a tag (e.g., tag 9F10 (IAD)) provided to the access device. The access device can read provisioned AID's on the user device and then determine authorizing entity created BINs (bank identification numbers) or assigned token ranges.

The access device can then determine if the transaction is authorized by 1) an authorizing entity computer associated with the access device (e.g., an on-us interaction) or by 2) an authorizing entity not associated with the access device (e.g., a not-on-us interaction). For example, the access device can determine the authorizing entity computer using the user identifier and/or the access token.

If the transaction is authorized by the authorizing entity computer associated with the access device, then the access device can transmit an authorization request message comprising the user identifier, the secret, and the access token to the authorizing entity computer. Upon receiving the authorization request message, the authorizing entity computer can validate the secret, retrieve a real credential of the user using the user identifier, and authorize the transaction. In some embodiments, the authorizing entity computer can determine if the real credential of the user is associated with the access token. In some embodiments, the user identifier may be encrypted such that the authorizing entity computer can identify and/or gain access to a plaintext user identifier.

In some embodiments, the authorizing entity computer can validate the secret by comparing the received secret to a previously stored secret associated with the real credential. For example, the previously stored secret can be a PIN created by the user of the real credential.

In some embodiments, the user identifier can be read, by the access device, from a first tag (e.g., 9F10) as well as, in some embodiments, the last 4 digits of a second tag (e.g., tag 9F19), to determine which account selection and service features to display to the user on the access device after authorization by the authorizing entity computer.

If the transaction is not associated with the authorizing entity computer, then the access device can transmit the authorization request message comprising the user identifier, the secret, and the access token to a token service computer. The token service computer can detokenize the access token to obtain the real credential. The token service computer can then replace the access token with the real credential in the authorization request message to form a modified authorization request message and then forward the modified authorization request message to another authorizing entity computer for authorization.

Various embodiments can facilitate both on-us and not-on-us access device processing. While not-on-us access device processing can utilize access to designated primary accounts, on-us access device processing can facilitates with access to both primary and secondary accounts linked to single user credential (e.g., a PAN).

II. Systems

FIG. 1 shows a system 100 according to embodiments of the disclosure. The system 100 comprises a user device 102, an access device 104, an access device network 106, an authorizing entity computer A 108, a transport computer 110, a processing network computer 112, a token service computer 114, and a plurality of authorizing entity computers 116. The user device 102 can be in operative communication with the access device 104. The access device 104 can be in operative communication with the access device network 106 and the transport computer 110. The access device network 106 can be in operative communication with the processing network computer 112 and the authorizing entity computer A 108. The processing network computer 112 can be in operative communication with the authorizing entity computer A 108, the transport computer 110, and the token service computer 114, and the plurality of authorizing entity computers 116.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices in the system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include a device operated by a user. The user device 102 can include a digital wallet, in some embodiments, that stores an access token. The user device 102 can be configured to communicate with one or more access devices (e.g., the access device 104). The user device 102 can provide the access token and a user identifier to the access device 104 during an interaction (e.g., a payment transaction, a location access interaction, a data access interaction, an account access interaction, etc.). In some embodiments, a user can perform any suitable interaction with the access device 104 using the user device 102. For example, though an interaction a user can make a deposit, access multiple accounts, purchase goods, any combination thereof, etc.

The access device 104 can include a device that can, for example, read data from the user device 102, determine an authorizing entity computer associated with the access device 104 (e.g., the authorizing entity computer A 108) from a plurality of authorizing entity computers 116. The access device 104, in some embodiments, can be an automated teller machine (ATM).

The access device 104 can be associated with an authorizing entity computer (e.g., the authorizing entity computer A 108). The access device 104 and the authorizing entity computer A 108 can be associated in any suitable manner. For example, the access device 104 and the authorizing entity computer A 108 can be operated by the same entity (e.g., a bank, a security firm, a data providing entity, etc.). In some embodiments, the access device 104 can be associated with the authorizing entity computer A 108 by being at, or pertaining to, a same or similar location. For example, the access device 104 can be located at a secure building that users may access if they are associated with an access token for the secure building. The authorizing entity computer A 108 may also be associated with the secure building. For example, the authorizing entity computer A 108 can be a computer located at the secure building and may grant users access to the secure building (e.g., authorize the users to enter the secure building).

The access device network 106 can include any suitable network that can allow the access device 104 to communicate with the authorizing entity computer A 108. The access device network 106 can comprise one or more computers that can route messages between the access device 104 and the authorizing entity computer A 108. The access device network 106 can process transactions provided by the access device 104 in a manner specific to the access device 104. For example, the access device network 106 can be associated with the access device 104 (e.g., operated by a same or similar entity, etc.). As such, the access device network 106 can be configured to process data received from the access device 104 that is associated with the real credentials issued to the user. The access device 104 can present additional options (e.g., deposit cash, deposit checks, etc.) to the user when the user's real credentials and the access device 104 are associated with a same issuing entity. The user can select an option that might otherwise not be present if the user's real credentials and the access device 104 are not associated. The access device network 106 can be configured to process these options that are available to the user, whereas if the user's real credentials are associated with a different issuing entity, then the access device network 106 may not be configured to process data relating to the real credentials (or access token associated therewith). In such a case, the access device network 106 can send any relevant data to a different access device network that is associated with the different issuing entity. The access device network 106 can route transaction data to the different access device networks if the access device network 106 and the real credentials are not associated with the same entity.

Furthermore, access device network 106 may not be configured to transmit data to an authorizing entity computer to which the access device network 106 is not associated. In some cases, the access device network 106 may only provide data (e.g., transaction data, authorization request messages, etc.) to an associated authorizing entity computer, but not provide data to not associated authorizing entity computers. This may be due to a number of reasons, for example, the communications between the access device network 106 and the associated authorizing entity computer may be of unique formats and/or utilize specific cryptographic protocols such that a different access device network cannot communicate directly with the authorizing entity computer.

The transport computer 110 can include a computer that, at least routes messages between the access device 104 and a processing network computer 112. The transport computer 110 can be operated by an acquirer, which may typically be a business entity (e.g., a commercial bank) that has a business relationship with a particular merchant or other entity.

The processing network computer 112 can include a server computer used for processing interaction data (e.g., transaction data, access data, etc.). In some embodiments, the processing network computer 112 may be coupled to a database and may include any hardware, software, other logic, or combination of the preceding for servicing the requests from one or more client computers. The processing network computer 112 may comprise one or more computational apparatuses and may use any of a variety of computing structures, arrangements, and compilations for servicing the requests from one or more client computers. In some embodiments, the processing network computer 112 may operate multiple server computers. In such embodiments, each server computer may be configured to process transaction for a given region or handles transactions of a specific type based on transaction data.

The processing network computer 112 may include data processing subsystems, networks, and operations used to support and deliver authorization services, exception file services, and clearing and settlement services. An exemplary processing network computer 112 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer 112 may use any suitable wired or wireless network, including the Internet.

The processing network computer 112 can be in operative communication with the token service computer 114. The processing network computer 112 can provide access tokens to the token service computer 114. The token service computer 114 can determine a real credential associated (e.g., in a database) with the access token. The token service computer 114 can then provide the real credential to the processing network computer 112.

Figure 2:
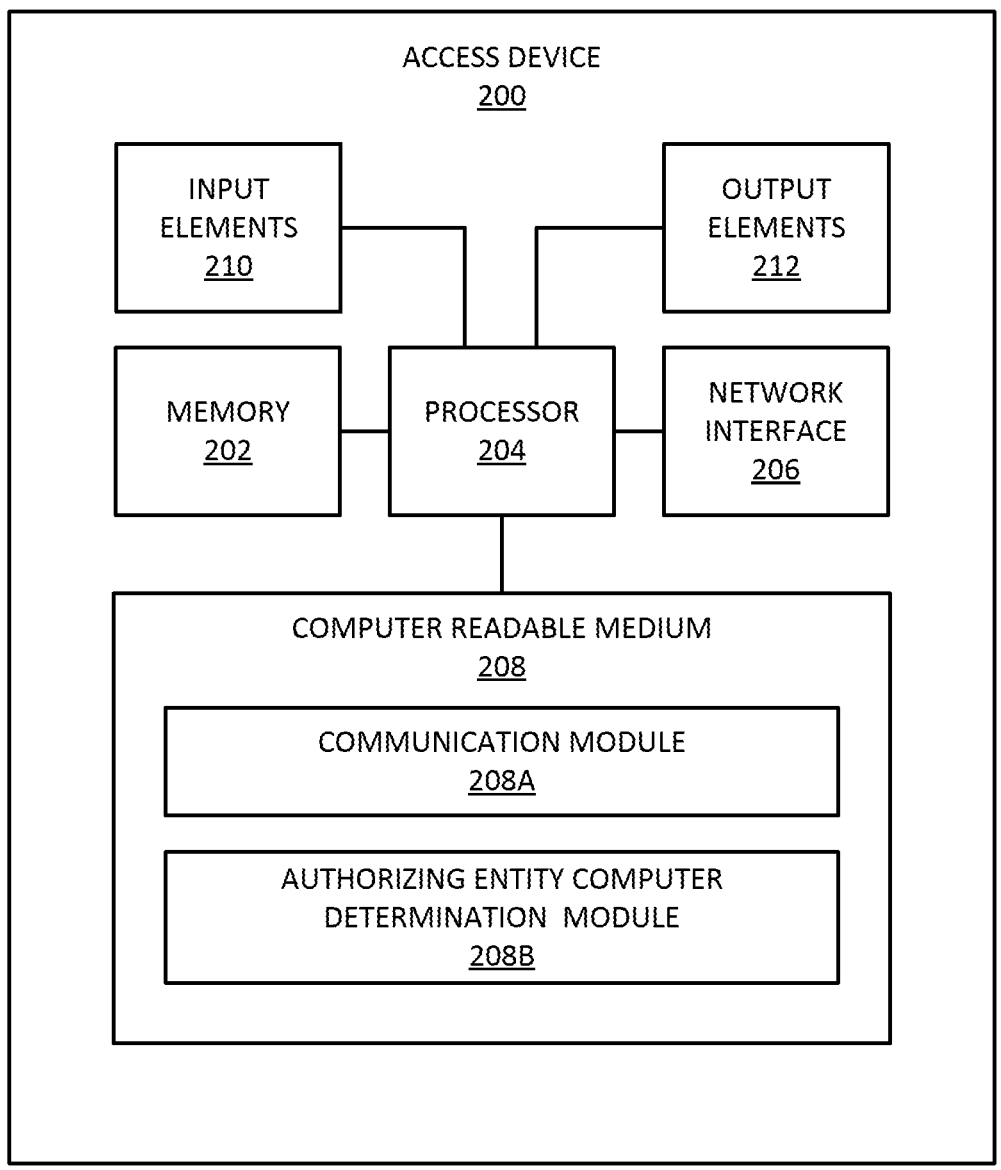
FIG. 2 shows a block diagram of components of an access device according to embodiments.

FIG. 2 shows a block diagram of an access device 200 according to embodiments. The exemplary access device 200 may comprise a processor 204. The processor 204 may be coupled to a memory 202, a network interface 206, input elements 210, output elements 212, and a computer readable medium 208. The computer readable medium 208 can comprise a communication module 208A and an authorizing entity computer determination module 208B.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store BIN tables, routing tables, etc.

The one or more input elements 210 may include any suitable device(s) capable of inputting data into the access device 200. Examples of input elements 210 include buttons, touchscreens, touch pads, microphones, etc.

The one or more output elements 212 may comprise any suitable device(s) that may output data. Examples of output elements 212 may include display screens, speakers, and data transmission devices. For example, the output elements 212 can include a display screen capable of displaying a response value to a user of the access device 200.

The computer readable medium 208 may comprise code, executable by the processor 204, for performing a method comprising: providing, by an access device to a user device associated with a user in a transaction, an initial communication, wherein the user device then retrieves a user identifier and an access token from a memory in the user device; receiving, by the access device from the user device, the user identifier and the access token; receiving, by the access device, a secret associated with the user; determining, by the access device, using the user identifier and/or the access token, if the transaction is authorized by an authorizing entity computer associated with the access device or by an authorizing entity not associated with the access device; if the transaction is authorized by the authorizing entity computer associated with the access device, then transmitting an authorization request message comprising the user identifier, the secret, and the access token to the authorizing entity computer, wherein the authorizing entity computer validates the secret, retrieves a real credential of the user using the user identifier, and authorizes the transaction; and if the transaction is not associated with the authorizing entity computer, then transmitting the authorization request message comprising the user identifier, the secret, and the access token to a token service computer, wherein the token service computer detokenizes the access token to obtain the real credential replaces the access token with the real credential in the authorization request message to form a modified authorization request message, and forwards the modified authorization request message to another authorizing entity computer for authorization.

A communication module 208A may be configured or programmed to perform some or all of the functionality associated with receiving, sending, and generating electronic messages for transmission at the access device 200 to or from any of the entities shown in FIGS. 1-7 (e.g., a user device, an access device network, a transport computer, etc.). When an electronic message is received by the access device 200 via the network interface 206, it may be passed to the communication module 208A. The communication module 208A may identify and parse the relevant data based on a particular messaging protocol used in the access device 200 (e.g., EMV 2.0, etc.). The communication module 208A may then transmit any received information to an appropriate module within the access device 200 (e.g., the authorizing entity computer determination module 208B). The communication module 208A may also receive information from one or more of the modules in the access device 200 and generate an electronic message in an appropriate data format in conformance with a transmission protocol used in the access device 200 so that the message may be sent to one or more entities within the system. The electronic message may then be passed to the network interface 206 for transmission.

The authorizing entity computer determination module 208B can include may comprise code or software, executable by the processor 204, for determining an authorizing entity computer. The authorizing entity computer determination module 208B, in conjunction with the processor 204, can determine, using a user identifier and/or an access token, if a transaction is authorized by an authorizing entity computer associated with the access device or by an authorizing entity not associated with the access device.

The authorizing entity computer determination module 208B, in conjunction with the processor 204, can determine if a transaction is authorized by an authorizing entity computer associated with the access device 200 or by an authorizing entity not associated with the access device 200 using a user identifier. For example, the authorizing entity computer determination module 208B, in conjunction with the processor 204, can determine that a particular portion of digits (e.g., first four, last two, etc.) corresponds to a particular authorizing entity computer. For example, the authorizing entity computer determination module 208B, in conjunction with the processor 204, can receive a user identifier of 123456789. The authorizing entity computer determination module 208B of the access device 200 can then, in conjunction with the processor 204, determine that the last two digits of 89 correspond to a first authorizing entity computer. The last two digits of 89 can also, in some embodiments, also correspond to the access device 200.

The authorizing entity computer determination module 208B, in conjunction with the processor 204, can determine if a transaction is authorized by an authorizing entity computer associated with the access device 200 or by an authorizing entity not associated with the access device 200 using an access token. For example, the access device can store a token range table (e.g., a BIN range table). The authorizing entity computer determination module 208B can determine an authorizing entity computer based on an access token received from the user device.

As an illustrative example, the access token can be "0123456789012345." The authorizing entity computer determination module 208B, in conjunction with the processor 204, can determine that the access token is included in a token range of, for example, 0123456780000000-0123456790000000. Each token range can be associated with an authorizing entity computer.

The network interface 206 may include an interface that can allow the access device 200 to communicate with external computers. The network interface 206 may enable the access device 200 to communicate data to and from another device. Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™.

Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

III. Methods

A. Provisioning

Figure 3:
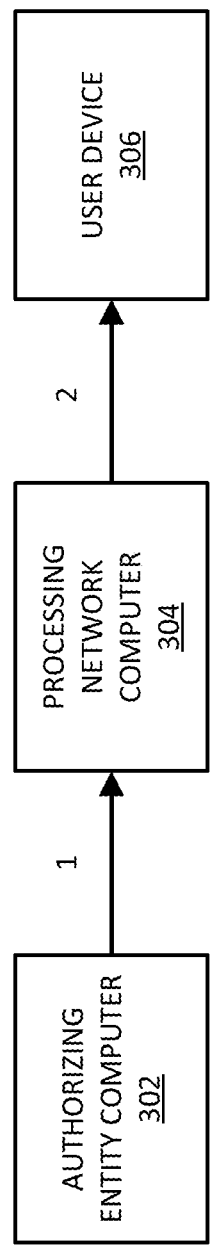
FIG. 3 shows a flow diagram illustrating a provisioning process according to embodiments.

FIG. 3 shows a flowchart of a provisioning method according to embodiments. The method illustrated in FIG. 3 will be described in the context of an authorizing entity provisioning a user device with a user identifier. It is understood, however, that the invention can be applied to other circumstances. Typically during a provisioning process, a user of a user device can select to input credentials (e.g., a PAN) into a digital wallet application on a user device. Upon receiving and storing the credentials, the user device can request a token to associate with the credentials from a processing network computer. After receiving the token request the processing network computer sends a provisioning request to the authorizing entity computer to request a user identifier. After receiving the user identifier, the processing network computer can send the token to the user device.

The method illustrated in FIG. 3 includes an authorizing entity computer 302 initiated provisioning process. At step 1, the authorizing entity computer 302 can initiate provisioning of a token and a user identifier to a user device 306. In some embodiments, the authorizing entity computer 302 can generate a user identifier. In other embodiments, the authorizing entity computer 302 can retrieve an existing user identifier associated with the user of the user device 306. The authorizing entity computer 302 can provide the user identifier to a processing network computer 304. For example, the authorizing entity computer 302 can provide a token provisioning request comprising the user identifier to the processing network computer 304.

At step 2, after receiving the token provisioning request, the processing network computer 304 can create an access token associated with the user. The access token can be generated in any suitable manner. For example, in some embodiments, the access token can be generated based on user credentials (e.g., a PAN) associated with the user of the user device 306. For example, the processing network computer 304 can receive the user credentials from the authorizing entity computer 302 or may have a database which stores user credentials and user identifiers associated with the user credentials. In other embodiments, the access token can be randomly generated and then assigned to (e.g., associated with) the user identifier and/or the user credentials. The processing network computer 304 can then provide the access token into digital wallet and/or database (e.g., a resource provider card-on-file database). The access token can be provided from the processing network computer 304 directly to the user device 306 and/or a digital wallet stored on the user device 306.

In some embodiments, the processing network computer 304 can personalize the access token. As an illustrative example, the following personalization profiles can be associated with an access token as depicted in Table 1, which describes values associated with the access token, and Table 2, which describes potential detokenization options for the access token.

A proprietary application identifier extension (PIX) and a registered application provider identifier (RID) can be provided. A PIX can be a variable length suffix that may be allocated by card procedures to differentiate between multiple applications (e.g., credit and debit applications) provided by that procedure. The value of any PIX can be proprietary for each procedure, and if present can be appended to an RID to create an application identifier (AID) of each application. The RID can be a fixed length unique identifier allocated to each card procedure to identify EMV applications provided by that procedure. The procedures may then suffix the RID with the PIX to further differentiate between multiple products supported by the procedure, and together they form the AID. The AID can be used to uniquely identify each EMV (Europay Mastercard Visa) application that an access device supports, and an AID can have an associated card procedure and parameters relating to how the application needs to be processed. An access device may contain any number of such applications, and the list of each supported AID is used during a candidate list creation process to generate a list of applications that are mutually supported by both the terminal and the card.

TABLE 1

Example global RID/PIX/AID values

| Establishment | RID | PIX (suffix) | AID | Description |
|---|---|---|---|---|
| Visa | A000000003 | 1010xx | A0000000031010xx | Visa (Debit/Credit) |
|  | A000000098 | 0840 | A00000000980840 | U.S. Common Debit |
| Proprietary | A000000003 | 3010 | A0000000033010xx | Interlink |
| ATM * | A000000003 | 8010 | A0000000038010 | Plus |
| Proprietary * | A000000003 | 8010 | A0000000038010 | Plus |

TABLE 2

Detokenization Options

| Establishment | RID | Routing to VTS | Call Out supported | ATM Token Exchange | Issuer Token Exchange | Proposed Detokenization Bypass |
|---|---|---|---|---|---|---|
| Visa | A000000003 | Visa | No | Yes | Yes | Yes |
|  | A000000098 | Any US Debit POS Network + | Yes - POS only N/A to ATM | Yes | Yes | No |

TABLE 2-continued

Detokenization Options

| Establishment | RID | Routing to VTS | Call Out supported | ATM Token Exchange | Issuer Token Exchange | Proposed De-tokenization Bypass |
|---|---|---|---|---|---|---|
| | | Visa or Plus | transaction | | | |
| Proprietary ATM | A000000003 | Visa or Plus | No | Yes | Yes | Yes |
| | | Interlink | No | No | No | No |
| Proprietary | A000000003 | Visa, Plus | No | Yes | Yes | Yes |
| | | Interlink | No | No | No | No |

B. Authorization

Figure 4:
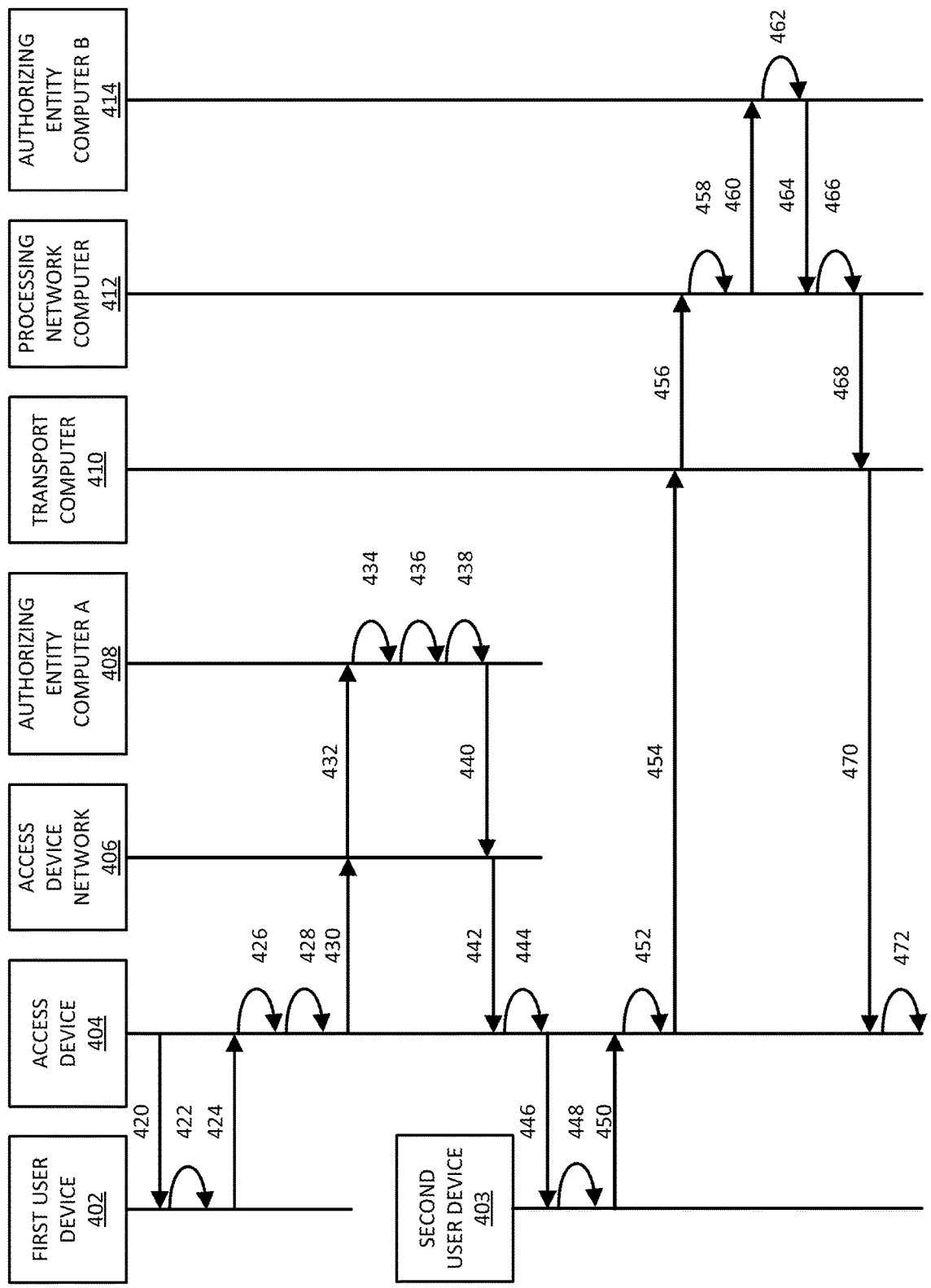
FIG. 4 shows a flowchart illustrating an authorization process according to embodiments.

FIG. 4 shows a flowchart illustrating an authorization process according to embodiments. The method illustrated in FIG. 4 will be described in the context of a first user device performing an authorization process with an access device (e.g., an on-us interaction), then a second user deice performing an authorization process with the access device (e.g., a not-on-us interaction). It is understood, however, that the invention can be applied to other circumstances (e.g., any suitable number of user devices performing an authorization process with the access device in any order, etc.). In some embodiments, the authorization process described in reference to FIG. 4 can be referred to as an on-us authorization process.

In some cases, a user device can provide a token to the access device. Upon receiving the token, the access device can route the token to a detokenization computer (e.g., a token service computer). Detokenization enables security within user controlled devices (e.g., the user device), and can facilitate the authorizing entity computer in determining which account and/or real credentials are associated with the token.

Embodiments described in reference to FIG. 4 have various advantages. For example, the following process described in reference to FIG. 4 can be efficient and can take less time to process a transaction, because fewer steps (e.g., detokenization processes) are not performed.

Prior to step 420, the first user device 402 can receive an access token via a provisioning process, for example, as described in reference to FIG. 3.

At step 420, an access device 404 can provide an initial communication to a first user device 402 associated with a user in a transaction. The initial communication can be, for example, a select proximity payment system environment (PPSE) command. The initial communication can, in some embodiments, allow the user device and the access device to determine a processing environment for subsequent communications. The PPSE commend and a PPSE response can be subsequently be followed by a get processing options command and response and a read record command and response. However, it is understood, that the communications between the access device 404 and the first user device 402 can include any suitable communications. In some embodiments, the communications that allow the access device 404 to retrieve data from the user device at and/or near the beginning of the process illustrated in FIG. 4 can collectively be referred to as an initial communication. Further details regarding the initial communication are described in further detail in reference to FIG. 5.

The initial communication can be provided to the first user device 402 upon the first user device 402 entering communication range with the access device 404. For example, the access device 404 can determine that the first user device 402 has entered short-range communication (e.g., NFC, Bluetooth, BLE, etc.).

At step 422, after receiving the initial communication from the access device 404, the first user device 402 can determine to provide a user identifier and an access token to the access device 404. The first user device 402 can retrieve the user identifier and the access token from a memory of the first user device 402. The user identifier can be a user information file identifier, also referred to as a customer information file identifier (CIF ID). The access token can be a token that corresponds to a real credential of the user.

At step 424, the first user device 402 can provide the user identifier and the access token to the access device 404. In some embodiments, the first user device 402 can provide the user identifier and the access token in the same response message or in different response messages (e.g., a first response message and a second response message). The communications between the first user device 402 and the access device 404 are discussed in further detail in regards to FIG. 5.

For example, the user identifier can be alphanumeric and may, in some embodiments, be unique to the user. For example, the user identifier provided from the first user device 402 to the access device 404 can be "NU486F100A." The access token can be a value of, for example, "0123456789123456."

At step 426, after receiving the user identifier and the access token from the first user device 402, the access device 404 can further receive a secret associated with the user. The access device 404 can prompt the user to input a secret (e.g., a PIN). For example, the access device 404 can display a message to the user on a display screen of the access device 404. The message can indicate to the user to enter a secret into the access device 404 via one or more input elements of the access device 404.

In some embodiments, at any suitable time during steps 420-426 the user can select one or more options displayed to the user on the access device 404. For example, the user can select to perform a withdrawal, perform a deposit, review account history, perform a transaction, etc. As an illustrative example, the user can select to perform a withdrawal (e.g., to obtain currency) from the access device 404. The option to perform a withdrawal can be included in authorization request and authorization response messages described below.

At step 428, the access device 404 can determine if the transaction is authorized by an authorizing entity computer associated with the access device or by an authorizing entity not associated with the access device using the user identifier and/or the access token. An authorizing entity computer that is associated with the access device can be owned and/or operated by the same entity. An authorizing entity that is not associated with the access device may not be owned and/or operated by the same entity. For example, the authorizing entity computer A 408 can be an authorizing entity computer that is associated with the access device. The authorizing entity computer B 414 can be an authorizing entity computer that is not associated with the access device 404.

For example, the access device 404 can determine, based on the access token, if the transaction is authorized by 1) an authorizing entity computer associated with the access device or by 2) an authorizing entity computer not associated with the access device. For example, the access device 404 can determine to which BIN range the access token belongs (e.g., numerically lies within). An access token can be generated within a BIN range that has been associated with a particular authorizing entity computer. The access device 404 can determine that the received access token lies within a BIN range that is associated with the authorizing entity that is further associated with the access device. Similarly, the BIN range can be also associated with the access device 404 itself. If the access device 404 determines that the access token lies within the BIN range associated with the access device 404, then the access device 404 can determine that the transaction is authorized by an authorizing entity computer associated with the access device.

The access device 404 can store a BIN table that can be referenced to determine which authorizing entity computer can authorize the transaction with the received access token.

As an illustrative example, the access device 404 can evaluate the received access token of 0123456789123456. The access device 404 can be associated with an authorizing entity computer (e.g., the authorizing entity computer A 408), where both devices correspond to a range of 0123450000000000-0123459999999999. The access device 404 can determine that the received access token of 0123456789123456 is a value that lies within the range of 0123450000000000-0123459999999999, and then determine that the access token is authorized by an authorizing entity computer associated with the access device 404.

At step 430, the access device 404 can generate an authorization request message comprising the user identifier, the secret, and the access token. If the transaction is authorized by the authorizing entity computer (the authorizing entity computer A 408) associated with the access device 404, then at step 430, the access device 404 can transmit the authorization request message comprising the user identifier, the secret, and the access token to an access device network 406.

At step 432, after receiving the authorization request message from the access device 404, the access device network 406 can provide the authorization request message to the authorizing entity computer A 408.

At step 434, after receiving the authorization request message, the authorizing entity computer A 408 can validate the secret. For example, the secret can be a PIN entered by the user directly into the access device 404. The authorizing entity computer A 408 can compare the received PIN to a stored PIN (e.g., previously created by the user or assigned to the user). If the received PIN matches the stored PIN, then the authorizing entity computer A 408 can determine that the user is authentic.

At step 436, the authorizing entity computer A 408 can retrieve a real credential of the user using the user identifier. For example, the authorizing entity computer A 408 can determine a user information file (e.g., a customer information file (CIF)) that is stored in relation to and/or comprises the user identifier. The user information file can include one or more real credentials. The authorizing entity computer A 408 can determine at least one real credential based on the received user identifier.

As an illustrative example, the authorizing entity computer A 408 can determine that the received user identifier of NU486F100A is associated with a first user information file in the database. The first user information file can include the user identifier of NU486F100A. The first user information file can include one or more account numbers that can be accessed by the user. For example, the first user information file can include a first account number of 0123455555123456 (which can be the real credential), a second account number of 0123456888999999, and a third account number of 0123456777888999. The first user information file can include any suitable number of account numbers, where each account number can be for a same or a different type of account including, but not limited to, a checking account, a savings account, a money market account, a brokerage account, an investment retirement account, and/or any other account which can be accessed by the user.

In some embodiments, after determining and retrieving the real credential of the user, the authorizing entity computer A 408 can link the real credential (e.g., a PAN) to the access token. For example, the authorizing entity computer A 408 can store in an interaction log, or other suitable database, information regarding the interaction (e.g., transaction). The authorizing entity computer A 408 can store the real credential and the access token together in the log, such that at any suitable point in time thereafter, an entity and/or device can determine that the interaction was performed with the access token and the real credential.

At step 438, the authorizing entity computer A 408 can determine whether or not to authorize the transaction. The authorizing entity computer A 408 can generate an indication of whether or not the transaction is authorized. The authorizing entity computer A 408 can generate an authorization response message comprising an indication of whether or not the transaction is authorized. In some embodiments, the authorizing entity computer A 408 can include one or more account numbers to which the user has access to for the current interaction in the authorization response message.

At step 440, the authorizing entity computer A 408 can provide the authorization response message to the access device network 406.

At step 442, after receiving the authorization response message from the authorizing entity computer A 408, the access device network 406 can provide the authorization response message to the access device 404.

At step 444, after receiving the authorization response message, the access device 404 can determine whether or not transaction was authorized by the authorizing entity computer A 408. If the transaction is authorized, the access device 404 can display any suitable information to the user on the display of the access device 404. For example, the access device 404 can display one or more accounts and/or account options to the user. As another example, the access device 404 can provide the user with currency and/or goods associated with the transaction. As yet another example, the access device 404 can provide access to a secure building, a secure webpage, secure data, etc.

As an example, the access device 404 can display options relating to the user's initial selection (e.g., perform a withdrawal). The access device 404 can display one or more account's received from the authorizing entity computer A 408, from which the user can select to withdrawal currency. For example, in some embodiments, the user can select to withdrawal money from the account associated with the real credential and the access token. In other embodiments, the user can select to withdrawal money from a displayed account that is not associated with the real credential and the access token, but is accessible by the user.

After the first user device 402 performs a transaction with the access device 404, a second user device 403 can perform a second transaction with the access device 404.

At step 446, an access device 404 can provide an initial communication to a second user device 403 associated with another user in a transaction. The transaction conducted using the first user device 404 may be by a first user. The transaction conducting using the second user device 403 may be by a second user. In step 446, the initial communication can request a user identifier and an access token.

The initial communication can be provided to the second user device 403 upon the second user device 403 entering communication range with the access device 404. For example, the access device 404 can determine that the second user device 403 has entered short-range communication (e.g., NFC, Bluetooth, BLE, etc.).

At step 448, after receiving the initial communication from the access device 404, the second user device 403 can determine to provide a user identifier and an access token to the access device 404. The second user device 403 can retrieve the user identifier and the access token from a memory of the second user device 403. At step 450, the second user device 403 can provide the user identifier and the access token to the access device 404. In some embodiments, the second user device 403 can provide the user identifier and the access token in the same response message or in different response messages (e.g., a first response message and a second response message).

At step 452, after receiving the user identifier and the access token from the second user device 403, the access device 404 can determine if the transaction is authorized by an authorizing entity computer associated with the access device or by an authorizing entity not associated with the access device using the user identifier and/or the access token. For example, the authorizing entity computer A 408 can be an authorizing entity computer that is associated with the access device. The authorizing entity computer B 414 can be an authorizing entity computer that is not associated with the access device 404 (e.g., not within the same common network as the authorizing entity computer).

The access device 404 can determine that the received access token is associated with an authorizing entity not associated with the access device. For example, the access device 404 can determine that the transaction is authorized by an authorizing entity not associated with the access device (e.g., the authorizing entity computer B 414).

In some embodiments, the access device 404 can further receive a secret associated with the user. The access device 404 can prompt the user to input a secret (e.g., a PIN). For example, the access device 404 can display a message to the user on a display screen of the access device 404. The message can indicate to the user to enter a secret into the access device 404 via one or more input elements of the access device 404.

At step 454, the access device 404 can generate an authorization request message comprising the user identifier, the secret, and the access token. Since the transaction is authorized by the authorizing entity computer B 414 that is not associated with the access device 404, then the access device 404 can transmit the authorization request message comprising the user identifier, the secret, and the access token to a transport computer 410.

At step 456, the transport computer 410 can provide the authorization request message to a processing network computer 412.

At step 458, after receiving the authorization request message, the processing network computer 412 can determine a real credential (e.g., a PAN) associated with the access token. For example, the processing network computer 412 can provide the access token to a token service computer. The token service computer can determine, using a database, a real credential that is stored in association with the access token. The token service computer can then provide the real credential to the processing network computer 412. The processing network computer 412 can then modify the authorization request message to include the real credential, while removing the access token.

At step 460, the processing network computer 412 can then provide the authorization request message (e.g., the modified authorization request message) to the authorizing entity computer B 414.

At step 462, after receiving the authorization request message, the authorizing entity computer B 414 can determine whether or not to authorize the transaction. For example, the authorizing entity computer B 414 can determine whether or not to authorize the transaction based on, at least, the received real credential. The authorizing entity computer B 414 can generate an authorization response message comprising an indication of whether or not the interaction is authorized and the real credential. In some embodiments, the authorizing entity computer B 414 can also verify the received secret, as described herein.

At step 464, the authorizing entity computer B 414 can then provide the authorization response message to the processing network computer 412.

At step 466, after receiving the authorization response message comprising the indication of whether or not the interaction is authorized and the real credential, the processing network computer 412 can modify the authorization response message to replace the real credential with the token.

At step 468, after modifying the authorization response message, the processing network computer 412 can then provide the authorization response message (e.g., the modified authorization response message) to the transport computer 410.

At step 470, after receiving the authorization response message, the transport computer 410 can provide the authorization response message to the access device 404.

At step 472, after receiving the authorization response message (e.g., the modified authorization response message) from the transport computer 410, the access device 404 can display the authorization response message and/or the indication of whether or not the interaction is authorized to the user of the second user device 403. For example, in some embodiments, if the interaction is authorized, then the access device 404 may provide currency and/or goods to the user of the user device. In other embodiments, if the interaction is not authorized, then the access device 404 can display an "interaction declined" message to the user. The access device 404 can then prompt the user to input additional credentials and/or user known secret with which to re-attempt the transaction.

In some embodiments, the aforementioned authorization process can optionally include detokenization by a token service computer. For example, during a closed loop or "on-us" transaction, an access token can be detokenized by a token service computer. By detokenizing the access token during a closed loop transaction, the real credential utilized in the transaction can be provided to the authorizing entity computer for authorization. In some embodiments, during the detokenization process, a cryptogram can be provided from the user device 402 to the access device 404. For example, the cryptogram can be a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. For example, a cryptogram may include a dCVV (dynamic card verification value). The cryptogram can provide the system with further security benefits as the cryptogram can be generated based on the current interaction between the user device 402 and the access device 404.

The cryptogram can be generated in any suitable manner. For example, the input to the cryptogram can include data elements including an account identifier such as primary account number, and a variable data element such as a counter, a time of day, or interaction value. Such data may be included using an encryption process such as DES, triple DES, or AES using any suitable encryption keys. The encryption keys may also be UDKs or unique derived keys, and may be generated based upon device specific information such as an account number, which may be encrypted using a master derivation key (MDK). The cryptogram can be verified by another computer such a remote computer by either decrypting the cryptogram to and verifying the decrypted contents with other data (e.g., an account number stored on file), or by encrypting other inputs and then comparing the encrypted result to the cryptogram.

After receiving the authorization request message further including the cryptogram from the access device 404 at step 406, the access device network 406 can determine that the token in the authorization request message should be detokenized by the processing network computer 412. The access device network 406 can transmit the authorization request message to the processing network computer 408. After receiving the authorization request message, the processing network computer 408 can determine a real credential (e.g., a PAN) associated with the access token through one or more communications with a token service computer (not shown). After receiving the access token from the processing network computer 408, the token service computer can determine a real credential that is associated with the received access token. For example, the real credential can be stored in association with (e.g., relation to) the access token in a secure token database (e.g., a token vault).

The token service computer can provide the real credential to the processing network computer 408. After receiving the real credential from the token service computer, the processing network computer 408 can then modify the authorization request message to include the real credential.

In some embodiments, the processing network computer 408 can verify the cryptogram provided from the user device 402 to the access device 404. By verifying the cryptogram, the processing network computer 408 can authenticate the user device 402, since only the user device 402 can provide the correct cryptogram. Thus, by performing the optional detokenization process, the processing network computer 408 can provide for additional security benefits by authenticating the user device 402.

The processing network computer 412 can then provide the modified authorization request message to the access device network 406 for authorization. After the interaction is authorized, or not authorized, the system can perform a tokenization process, where the processing network computer 412, in conjunction with the token server computer, determines the token based on the real credential and replaces the real credential with the token in the authorization response message.

C. Communication Details

Figure 5:
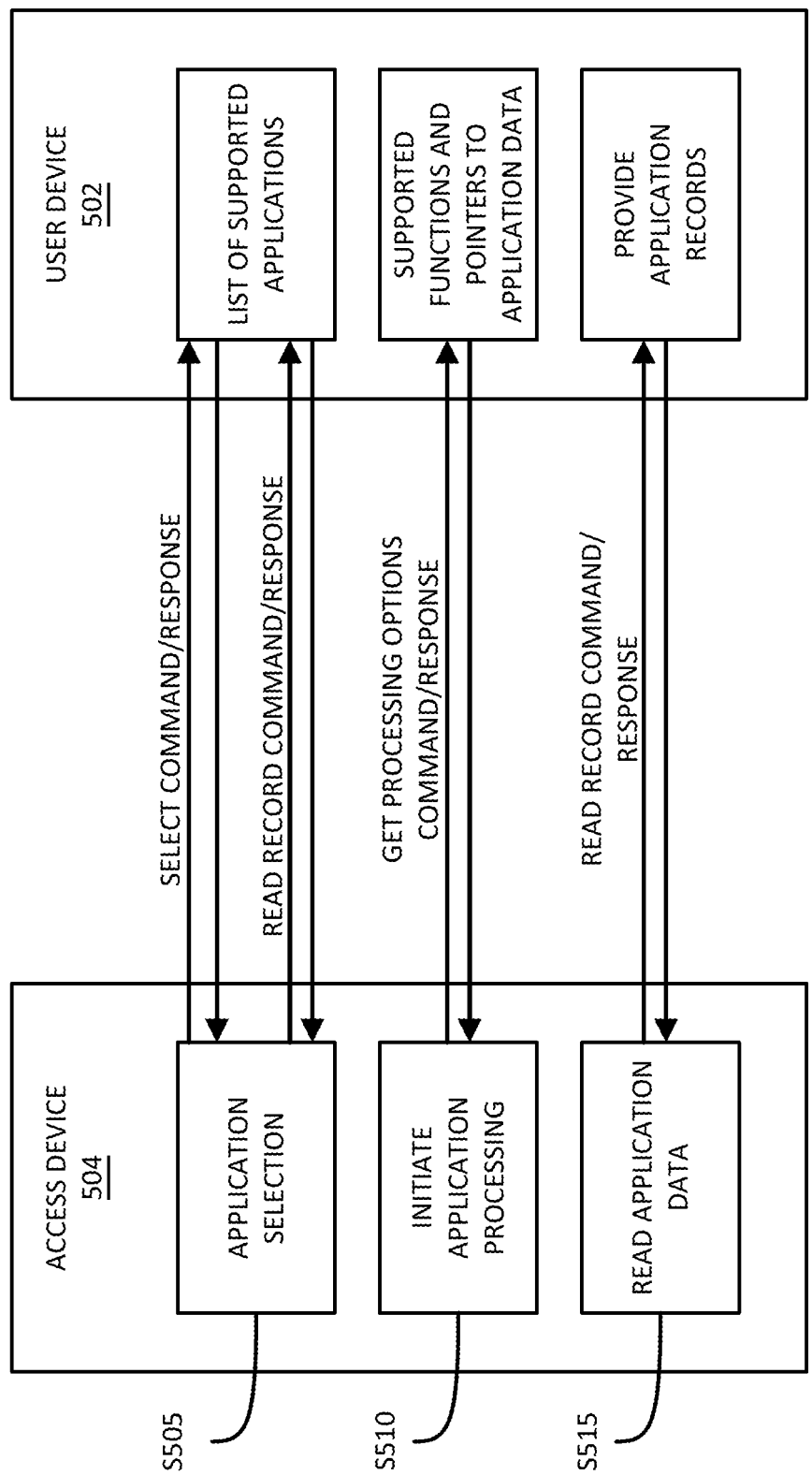
FIG. 5 shows a flowchart illustrating a device communication method according to embodiments.

FIG. 5 shows a flowchart illustrating a device communication method according to embodiments. The method illustrated in FIG. 5 will be described in the context of an access device and a user device communicating. It is understood, however, that the invention can be applied to other circumstances.

At step S505, the access device 504 can perform application selection with the user device 502 to select an application for further processing. For example, the access device 504 may determine which applications are supported by both the user device 502 and the access device 504. In some embodiments, when the access device 504 detects the presence of the user device 502, the access device 504 may send an available applications request (which may be a "select command") to the user device 502 to request information on which payment applications (e.g., a list of AIDS) may be available at the user device 502. In some embodiments, the application selection command can be a PPSE command.

The user device 502 may respond by sending an available applications response back to access device 504. The available applications response (which may be a "select response") may include a list of available AIDs (application identifiers).

The access device 504 can then select a suitable application from the list of applications received in the available applications response (e.g., by selecting an AID from the available AIDs). The access device 504 may also send an application selection message (which may be a "read record" or "select AID" command) with the selected AID to the user device 502.

The user device 502, upon receiving the select AID command, can send a response (e.g., a "read record response") for transaction data to the access device 504, which may be needed to execute a transaction using the selected application/AID. The request may include a list of transaction data identifiers, and the list can be in the form of a processing options data object list (PDOL).

At step S510, the access device 504 can initiate application processing with the user device 502. For example, the access device 504 may request that the user device 502 indicate data (e.g., a list of files containing the data) to be used for the selected application and the functions supported. In some embodiments; the access device 504 may send a get processing options (GPO) command. The access device 504 may also provide transaction information to the user device 502 (e.g.; via the GPO command).

The user device 502, upon receiving the GPO command, can generate dynamic transaction processing information using at least some of the received transaction data, and send (via a "GPO response") a set of transaction processing information to the access device 504. The transaction processing information may include one or more application file locators (AFLs) that can be used as file addresses by access device 504 to read account data stored on user device 502. In some embodiments, in response to the GPO command, the user device 502 can retrieve an user identifier (e.g., a CIF ID) from memory. The user device 502 can provide the user identifier to the access device in the GPO response. For example, the user identifier can be included in a tag 9F10, which can include issuer application data (IAD). The user identifier included in the tag 9F10 can be of variable length up to, for example, 32 bytes.

At step S515, the access device 504 may read application data. For example, the access device 504 may send a "read record command" to the user device 502 to read account data stored at the user device 502.

The user device 502 can send the account data to the access device 504 (e.g., via a "read record response"). The account data may include, for example, track-2 equivalent data (e.g., an account identifier and/or other payment credentials) and the cardholder name, and/or other account related data that is accessible at the AFL location. In some embodiments, in response to the read record command, the user device 502 can retrieve a token (e.g., an access token) from memory. The user device 502 can provide the token to the access device 504 in the read record response.

Embodiments of the disclosure have a number of advantages. For example, embodiments provide for on-us token processing for ATM transactions. Embodiments provide for efficient processing of token transactions when an access device is associated with an authorizing entity computer that authorizes the transaction. For example, embodiments do not need to route every authorization request message through a token service computer. Embodiments allow for an authorizing entity computer to associate determined real credentials with access tokens without the need to detokenize access tokens at a token service computer during a transaction. Once determined, the real credentials can be used to conduct transactions. Embodiments of the invention also allow for the user of a user device with an access token to conduct a transaction with an authorizing entity computer without using an out of network detokenization server. This saves multiple messages and communications, and therefore processing time.

Although the steps in the flowcharts and process flows described above are illustrated or described in a specific order, it is understood that embodiments of the invention may include methods that have the steps in different orders. In addition, steps may be omitted or added and may still be within embodiments of the invention.

Another embodiment includes a method comprising: receiving, by a user device associated with a user in a transaction from an access device, an initial communication; retrieving, by the user device, a user identifier and an access token from a memory in the user device in response to the initial communication; and providing, by the user device to the access device, the user identifier and the access token, wherein the user provides a secret to the access device, wherein the access device determines, using the user identifier and/or the access token, if the transaction is authorized by an authorizing entity computer associated with the access device or by an authorizing entity not associated with the access device, and if the transaction is authorized by the authorizing entity computer associated with the access device, then the access device transmits an authorization request message comprising the user identifier, the secret, and the access token to the authorizing entity computer, wherein the authorizing entity computer validates the secret, retrieves a real credential of the user using the user identifier, and authorizes the transaction, and if the transaction is not associated with the authorizing entity computer, then the access device transmits the authorization request message comprising the user identifier, the secret, and the access token to a token service computer, wherein the token service computer detokenizes the access token to obtain the real credential replaces the access token with the real credential in the authorization request message to form a modified authorization request message, and forwards the modified authorization request message to another authorizing entity computer for authorization.

Further, in some embodiments, the initial communication includes a get processing options command and a read record command, and wherein providing the user identifier and the access token further comprises: providing, by the user device, a get processing options response comprising the user identifier in response to the get processing options command; and providing, by the user device, a read record response comprising the access token in response to the read record command.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
providing, by an access device to a user device associated with a user in a transaction, an initial communication;
responsive to providing the initial communication, receiving, by the access device from the user device, a user identifier and an access token;

receiving, by the access device, a secret associated with the user;

determining, by the access device, using the user identifier and/or the access token, if the transaction is authorized by an authorizing entity computer associated with the access device or by an authorizing entity not associated with the access device;

if the transaction is authorized by the authorizing entity computer associated with the access device, then transmitting an authorization request message comprising the user identifier, the secret, and the access token to the authorizing entity computer, wherein the authorizing entity computer validates the secret, retrieves a real credential of the user using the user identifier, and authorizes the transaction; and if the transaction is not associated with the authorizing entity computer, then transmitting the authorization request message comprising the user identifier, the secret, and the access token to a token service computer, wherein the token service computer detokenizes the access token to obtain the real credential replaces the access token with the real credential in the authorization request message to form a modified authorization request message, and forwards the modified authorization request message to another authorizing entity computer for authorization.

2. The method of claim 1, wherein the method further comprises:

receiving, by the access device, an authorization response message comprising at least an indication of whether or not the transaction is authorized from the authorizing entity computer; and displaying, by the access device, the indication of whether or not the transaction is authorized on a display of the access device to the user of the user device.

3. The method of claim 1, further comprising:

prompting, by the access device, the user to input the secret via one or more input elements on the access device.

4. The method of claim 1, wherein if the transaction is authorized by the authorizing entity computer associated with the access device, the authorizing entity computer validates the access token using the real credential.

5. The method of claim 1, wherein the user identifier identifies a user information file, wherein the secret is a personal identification number, and wherein the real credential is a primary account number.

6. The method of claim 1, wherein the initial communication includes a get processing options command and a read record command.

7. The method of claim 6, wherein receiving the user identifier and the access token further comprises:

receiving, by the access device, a get processing options response comprising the user identifier in response to the get processing options command; and receiving, by the access device, a read record response comprising the access token in response to the read record command.

8. The method of claim 1, wherein if the transaction is authorized by the authorizing entity computer associated with the access device, then transmitting the authorization request message comprising the user identifier, the secret, and the access token to the authorizing entity computer further comprises:

transmitting, by the access device, the authorization request message comprising the user identifier, the secret, and the access token to the authorizing entity computer via an access device network.

9. The method of claim 1, wherein the token service computer provisions the user device with the access token.

10. An access device comprising:

a processor; and a non-transitory computer-readable medium coupled to the processor, the computer-readable medium comprising code executable by the processor for implementing a method comprising:

providing, by the access device to a user device associated with a user in a transaction, an initial communication;

responsive to providing the initial communication, receiving, from the user device, a user identifier and an access token;

receiving a secret associated with the user;

determining using the user identifier and/or the access token, if the transaction is authorized by an authorizing entity computer associated with the access device or by an authorizing entity not associated with the access device;

if the transaction is authorized by the authorizing entity computer associated with the access device, then transmitting an authorization request message comprising the user identifier, the secret, and the access token to the authorizing entity computer, wherein the authorizing entity computer validates the secret, retrieves a real credential of the user using the user identifier, and authorizes the transaction; and if the transaction is not associated with the authorizing entity computer, then transmitting the authorization request message comprising the user identifier, the secret, and the access token to a token service computer, wherein the token service computer detokenizes the access token to obtain the real credential replaces the access token with the real credential in the authorization request message to form a modified authorization request message, and forwards the modified authorization request message to another authorizing entity computer for authorization.

11. The access device of claim 10, wherein if the transaction is not associated with the authorizing entity computer, the token service computer forwards a modified authorization response message to the access device via a transport computer.

12. The access device of claim 11, wherein the method further comprises:

receiving, by the access device, the modified authorization response message from the token service computer; and displaying, by the access device, an indication of whether or not the transaction is authorized by the another authorizing entity computer on a display of the access device to the user of the user device.

13. The access device of claim 10, wherein if the transaction is authorized by the authorizing entity computer associated with the access device, the method further comprises:

transmitting, by the access device, the authorization request message to the token service computer via an access device network.

14. The access device of claim 13, wherein the authorizing entity computer generates an authorization response message comprising at least an indication of whether or not the transaction is authorized and the real credential and provides the authorization response message to the token service computer, wherein the token service computer tokenizes the real credential to obtain the access token, replaces the real credential with the access token to form a modified authorization response message, and forwards the modified authorization response message to the access device, wherein the method further comprises:
- receiving, by the access device, the authorization response message; and
- displaying, by the access device, the indication of whether or not the transaction is authorized by the authorizing entity computer on a display of the access device to the user of the user device.

15. The access device of claim 10, wherein the initial communication is provided to the user device via a short-range communication channel.

16. The access device of claim 10, wherein the user device is a first user device and comprises a memory, the transaction is a first transaction, the initial communication is a first initial communication, the user identifier is a first user identifier, the access token is a first access token, the memory is a first memory, the secret is a first secret, the authorization request message is a first authorization request message, the modified authorization request message is a first modified authorization request message, the real credential is a first real credential, and wherein the method further comprises:
- providing, to a second user device associated with a second user in a second transaction, a second initial communication, wherein the second user device then retrieves a second user identifier and a second access token from a second memory in the second user device;
- receiving, by the access device from the second user device, the second user identifier and the second access token;
- receiving a second secret associated with the second user;
- determining using the second user identifier and/or the second access token, if the second transaction is authorized by the authorizing entity computer associated with the access device or by the authorizing entity not associated with the access device;
- if the second transaction is authorized by the authorizing entity computer associated with the access device, then transmitting a second authorization request message comprising the second user identifier, the second secret, and the second access token to the authorizing entity computer, wherein the authorizing entity computer validates the second secret, retrieves a second real credential of the second user using the second user identifier, and authorizes the second transaction; and
- if the second transaction is not associated with the authorizing entity computer, then transmitting the second authorization request message comprising the second user identifier, the second secret, and the second access token to the token service computer, wherein the token service computer detokenizes the second access token to obtain the second real credential, replaces the second access token with the second real credential in the second authorization request message to form a second modified authorization request message, and forwards the second modified authorization request message to the another authorizing entity computer for authorization.

17. The access device of claim 10, wherein the transaction is a location access transaction, wherein if the location access transaction is authorized, the method further comprises:
- providing, by the access device, access to a location of the location access transaction to the user.

18. The access device of claim 10, wherein the transaction is a data access transaction, wherein if the data access transaction is authorized, the method further comprises:
- providing, by the access device, data corresponding to the data access transaction to the user device of the user.

* * * * *